United States Patent [19]
Menon et al.

[11] Patent Number: 5,926,183
[45] Date of Patent: Jul. 20, 1999

[54] EFFICIENT RENDERING UTILIZING USER DEFINED ROOMS AND WINDOWS

[75] Inventors: Jai P. Menon, Peekskill, N.Y.; Jarek Roman Rossignac, Atlanta, Ga.

[73] Assignee: International Business Machines Corporation, Armonk, N.Y.

[21] Appl. No.: 08/752,139

[22] Filed: Nov. 19, 1996

[51] Int. Cl.$^6$ .................................................. G06F 15/00
[52] U.S. Cl. ............................................................ 345/422
[58] Field of Search ................................... 345/419, 422, 345/421, 113, 114

[56] References Cited

U.S. PATENT DOCUMENTS

| | | | |
|---|---|---|---|
| 5,027,292 | 6/1991 | Rossignac et al. | 395/122 |
| 5,268,995 | 12/1993 | Diefendorff et al. | 395/122 |
| 5,359,704 | 10/1994 | Rossignac et al. | 395/122 |
| 5,428,716 | 6/1995 | Brokenshire et al. | 395/121 |

OTHER PUBLICATIONS

Visibility Preprocessing for Interactive Walkthroughs, ACM Press Computer Graphics, vol. 25, No. 4, Jul. 1991, pp. 61–69.
Hierarchical Z–Buffer Visibility Computer Graphics Proceedings, Annual Conference Series, 1993, pp. 231–238.

*Primary Examiner*—Phu K. Nguyen
*Attorney, Agent, or Firm*—Jay P. Sbrollini; Perman & Green, LLP

[57] ABSTRACT

A room is a region of space, such as a volumetric cell, that is associated with certain objects that are potentially visible (or potentially not visible) when the camera lies within the room. The rooms are distinct from the objects that represent a scene. A preprocessing step checks whether the camera is within a room, and if so determines those objects of the scene that are potentially visible (or potentially not visible) from within the room. Only those objects that are potentially visible from within the room are then rendered for display.

16 Claims, 11 Drawing Sheets

EFFICIENT RENDERING UTILIZING USER DEFINED ROOMS AND WINDOWS

CROSS REFERENCE TO RELATED APPLICATIONS

The present application is related to U.S. Pat. application Ser. No. 08/752,138, filed concurrently herewith and assigned to the common assignee of the present application, herein incorporated by reference in its entirety.

BACKGROUND OF THE INVENTION

1. Technical Field

The invention relates generally to computer graphics systems, and, more particularly, to computer graphics systems that provide real-time interactive visualization of complex geometric models.

2. Description of the Related Art

Traditional computer graphics systems are used to model a scene of three-dimensional objects and render the scene for display on a two-dimensional display device such as a cathode ray tube or liquid crystal display. Typically, the three-dimensional objects of the scene are each represented by a multitude of polygons (or primitives) that approximate the shape of the object. The primitives that define an object are typically defined by coordinates in a local coordinate system. For example, one of the primitives that may be used to define an object is a triangle, which is defined by the coordinates of three vertices in the local coordinate system.

The rendering of a scene conventionally is divided into two stages: geometry processing and rasterization. Geometry processing typically includes a modeling transformation, lighting calculations, a viewing transformation, a clipping function, and viewport mapping. The modeling transformation transforms the primitives from the local coordinate system to a world coordinate system. The lighting calculations evaluate an illumination model at various locations: once per primitive for constant shading, once per vertex for Gouraud shading, or once per pixel for Phong shading. The viewing transformation transforms the primitives in world coordinates to a 3D screen coordinate system (sometimes referred to as the normalized projection coordinate system). The clipping function determines the primitives (or portions of the primitives) that are within the viewing frustrum. And viewport mapping maps the coordinates of the clipped primitives to the normalized device coordinate system (sometimes referred to as the 2D device coordinate system).

Rasterization is the process which converts the description of the clipped primitives generated during geometry processing into pixels for display. A typical primitive, as shown in FIG. 1A, is a triangle $T_1$. Other area or surface primitives conventionally are converted into one or more triangles prior to rasterization. Consequently, the conventional rasterization process need only to handle triangles. The triangle $T_1$ is represented by the (x,y,z) coordinates at each of its vertices. The (x,y) coordinates of a vertex tell its location in the plane of the display. The z coordinate tells how far the vertex is from the selected view point of the three-dimensional scene. Rasterization is typically divided into three tasks: scan conversion, shading, and visibility determination.

Scan conversion utilizes the (x,y) coordinates of the vertices of each triangle to compute a set of pixels S which is covered by the triangle.

Shading computes the colors of the set of pixels S covered by each triangle. There are numerous schemes for computing colors, some of which involve computationally intensive techniques such as texture mapping. Shading typically utilizes the lighting calculations described above with respect to geometric processing.

Visibility determination utilizes the z coordinate of each triangle to compute the set of pixels $S_v$ (a subset of S) which are "visible" for the triangle. The set $S_v$ will differ from the set S if any of the pixels in set S are covered by previously rasterized triangles whose z values are closer to the selected view point. Thus, for each triangle in the scene as described by all previously processed triangles, a pixel is "visible" if it is in the set $S_v$ or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, triangle T1 and T2, wherein triangle T1 is partially hidden by triangle T2. Visibility determination is traditionally accomplished using a z-buffer technique. The Z-buffer stores an entry for each pixel that represents the z-value of the visible primitive at the given pixel. The z-value (Znew) of a set of pixels covered by a given triangle is determined through interpolation. For each pixel within the set, Znew at the given pixel is compared to the z-value (Zold) stored as an entry in the Z-buffer corresponding to the given pixel, and the entry Zold is updated with Znew according to results of the compare operation.

Rasterization is completed by writing the colors of the set of visible pixels $S_v$ to an image buffer for display.

As scenes become more and more complex, traditional rendering techniques are too computationally intensive for many graphics systems and result in degraded performance. Alternate rendering techniques suitable for complex scenes have been proposed. For example, U.S. Pat. No. 5,086,496, to Mulmuley, entitled "Method for Hidden Line and Surface Removal in a Three Dimensional Display" utilizes stripped partitions of the viewing window (which are defined by boundaries that intersect at least one image vertex) and visibility pointers to faces that are visible within a given partition to perform the visibility determination of the faces.

In another example, Green et al., "Hierarchical Z-Buffer Visibility", Proc. ACM SIGGRAPH 93, pp. 231–238, 1993, describe a combination of two hierarchical data structures, an object-space tree and an image-space Z-pyramid, to accelerate scan conversion.

In addition, Teller et al., "Visibility Preprocessing for Interactive Graphics", Proc. ACM SIGGRAPH 91, pp. 61–69, 1991, describes an algorithm utilized during a visibility preprocessing phase that subdivides a model into a plurality of cells and generates cell-to-cell visibility information (which represents, for a given cell, the set of cells that are partially or completely visible from at least one point in the given cell). During an interactive walkthrough phase, an observer with a known position and view frustrum moves through the model. At each frame, the cell containing the observer is identified, and the contents of potentially visible cells (which is derived from the cell-to-cell visibility information generated during the preprocessing phase) are retrieved from storage. The set of potentially visible cells is further reduced by culling it against the observer's view frustrum to produce eye-to-cell information (which represents the set of cells that are partially or completely visible to an observer within the specified view frustrum). The contents of the remaining visible cells, as identified by the eye-to-cell information, are then sent to a graphics pipeline for hidden-surface removal and rendering. Teller et al., "Global Visibility Algorithms for Illumination Computations", Proc. ACM SIGGRAPH 93, pp. 239–246, 1993, applies these visibility pre-processing algorithms to radiosity computations.

Although such alternate techniques are designed to accelerate visibility determination during rasterization, these techniques are inflexible and in most instances add computationally intensive tasks to the rendering process that outweigh their benefits. Thus, there is a need in the art to provide for flexible rendering techniques that can be tailored to meet the requirements dictated by the varying complexity and characteristics found in today's three-dimensional models and scenes.

SUMMARY OF THE INVENTION

The above-stated problems and related problems of the prior art are solved with the principles of the present invention, efficient rendering utilizing user defined rooms wherein a mechanism is provided that allows a user to define one or more rooms. A room is a region of space, such as a volumetric cell. Data is stored that is associates the room with certain objects that are potentially visible (or potentially not visible) when the camera lies within the room. The rooms are distinct from the objects that represent a scene. A preprocessing step checks whether the camera is within a room, and if so utilizes the stored data to determines those objects of the scene that are potentially visible (or potentially not visible) from within the room. Only those objects determined to be potentially visible from within the room are then rendered for display.

In addition, data may be stored that associates one or more windows with a room. The window is a piece of geometry that defines visible/non-visible regions that depend upon the position, orientation and field of view of the camera with respect to the window. Those objects that are outside the set of objects associated with the room yet lie within the visible region defined by the window are preferably added to the objects rendered for display.

DETAILED DESCRIPTION OF THE PREFERRED EMBODIMENTS

Figure 1A:
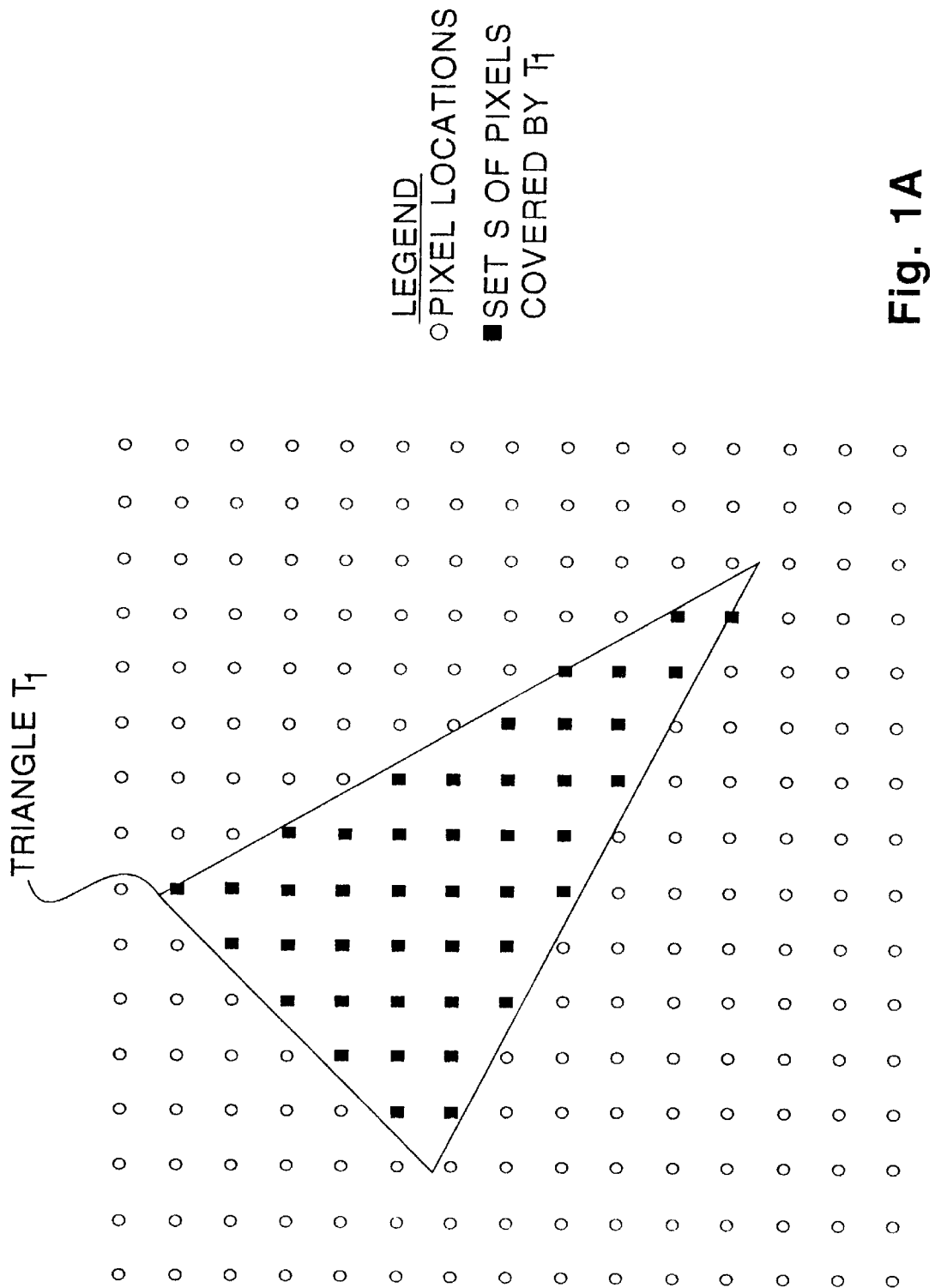
FIG. 1A is a pictorial representation of the rasterization of a triangle T1.
Figure 1B:
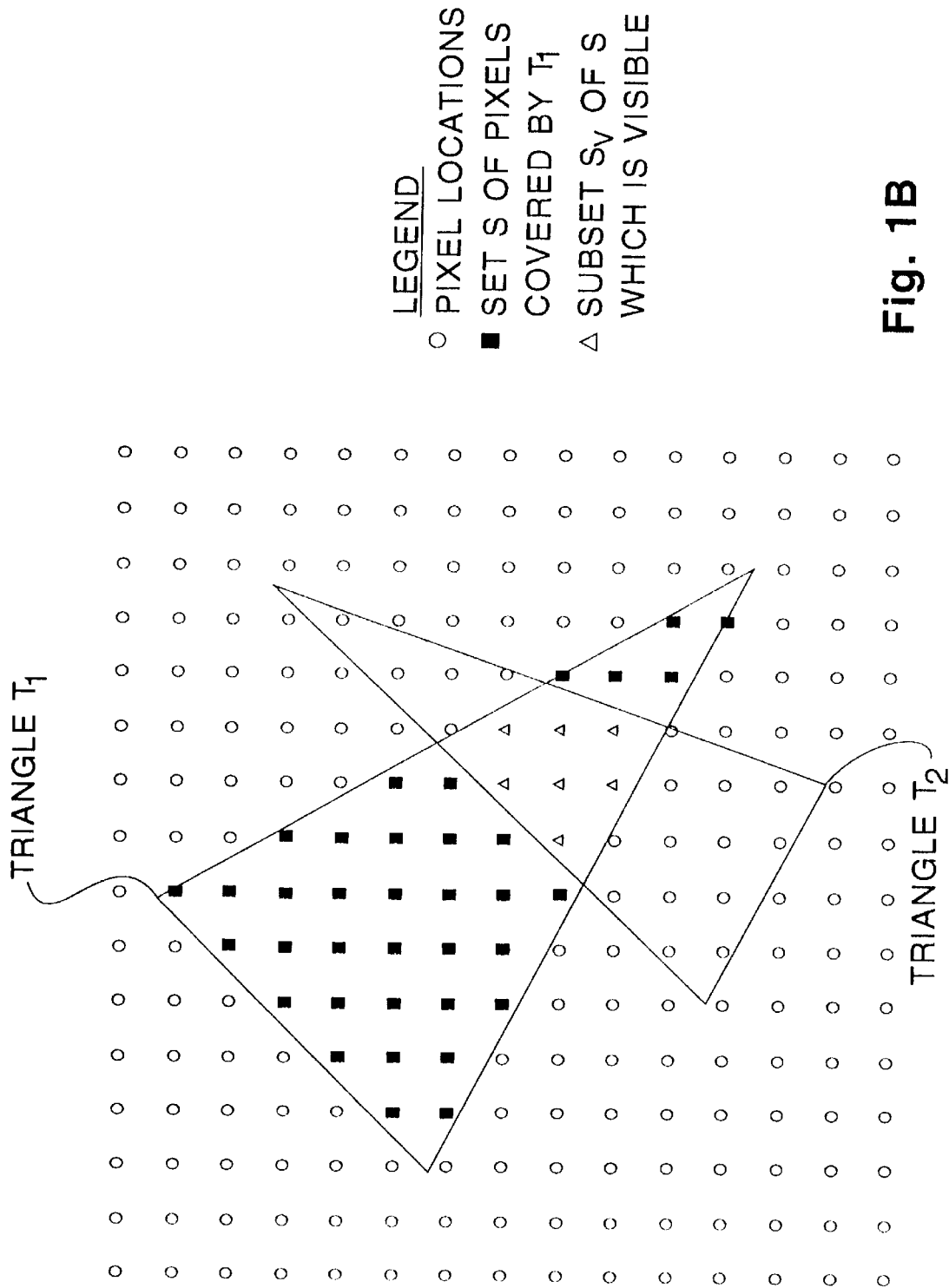
FIG. 1B is a pictorial representation of the rasterization of triangles T1 and T2, wherein triangle T1 is partially hidden by triangle T2.
Figure 2:
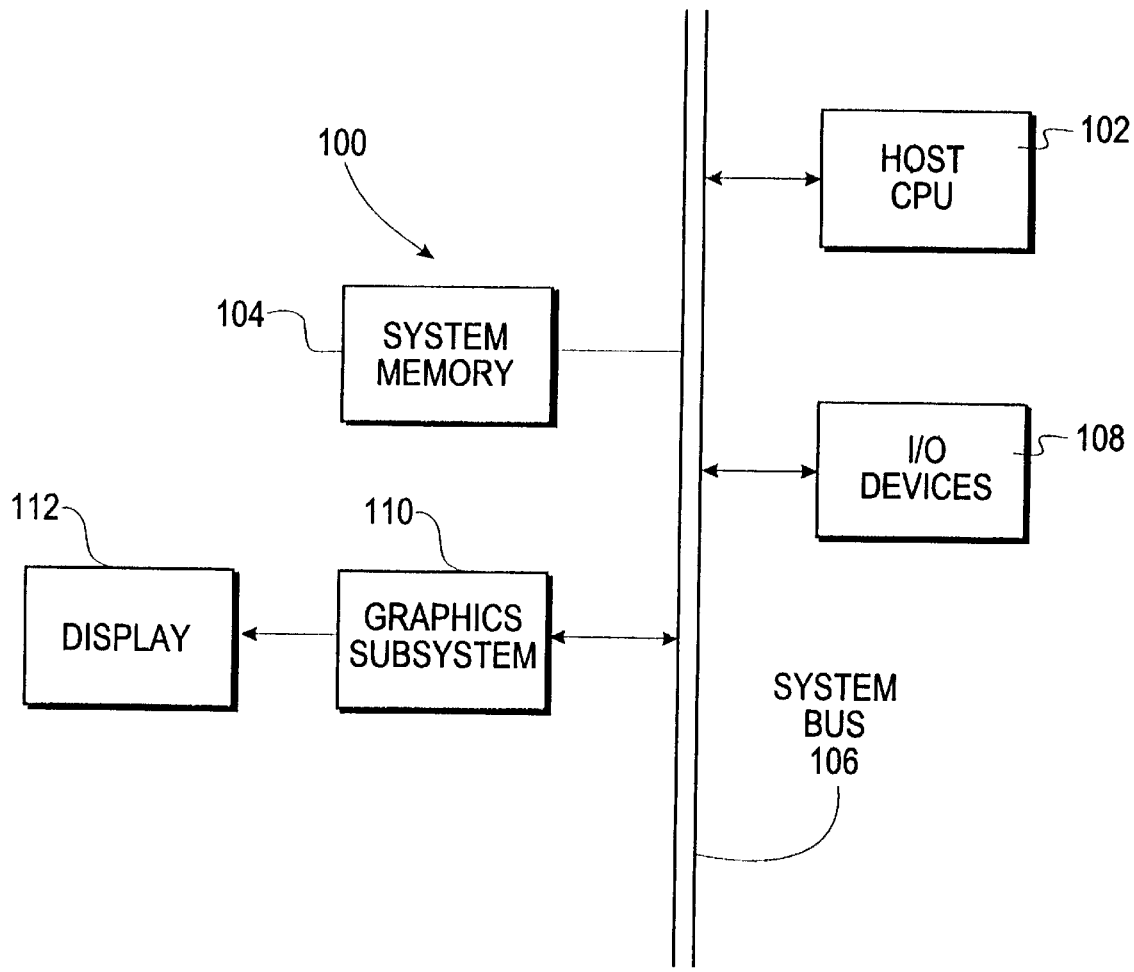
FIG. 2 is a functional block diagram of a graphics work station.

As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates in a local coordinate system and attributes (e.g. color, reflectance, texture) of primitives. The primitives are geometric entities such as a polygon, line or surface. Typically, the primitives are triangles defined by the coordinates of three vertices in the local coordinate system. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices. The transformation matrices are used to transform the objects of the scene from the local coordinate system to a world coordinate system, and thus specify the position, orientation and scale of the triangles in the scene.

Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any application software. As is conventional, the graphics data and application software is loaded from the non-volatile storage to the system memory 104 for access by the system processor 102.

The application software typically includes one or more user interfaces that provides the user with the ability to update the view point (or camera) and thus navigate through the scene. In addition, the application software typically includes one or more user interfaces that provide the user with the ability to perform animations, which is the view from a series of pre-defined view points. When the view point is updated, the application software typically utilizes the transformation matrices stored in the system memory 104 to transform the primitives of the scene from the local coordinate system to a world coordinate system. The application software executing on the host processor 102 then supplies a graphics order to render the scene to a graphics subsystem 110 that interfaces to the system memory 104 via the system bus 106.

Figure 3:
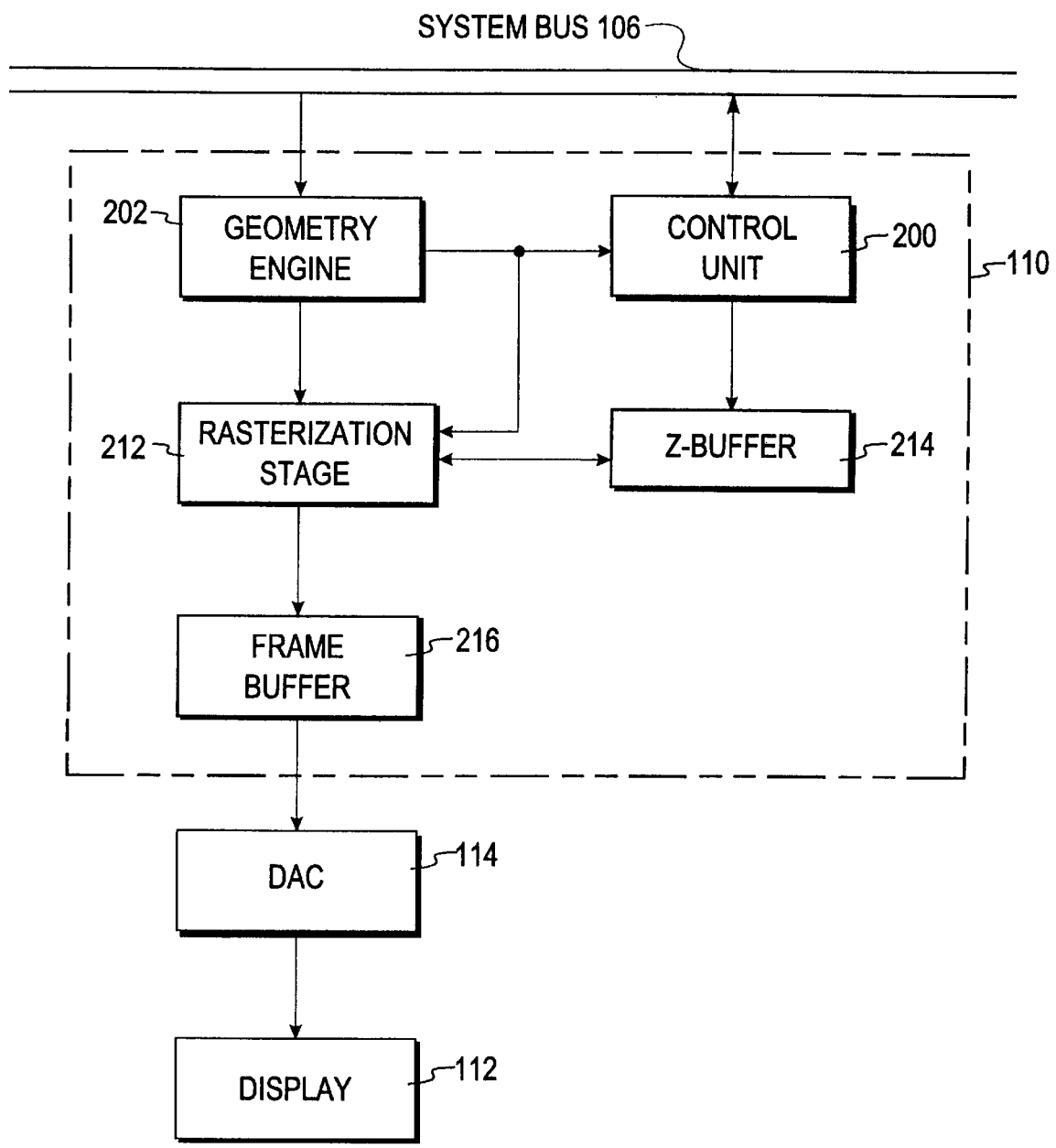
FIG. 3 is a functional block diagram of a graphics subsystem of the graphics work station of FIG. 2.

Generally, the graphics subsystem 110 operates to render the graphics data stored in the system memory 104 for display on a display area of a display device 112 according to the graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically consist of a sequence of data blocks that include, or point to, the graphics data (e.g. coordinates and attributes of one or more primitives) that defines the primitives of the scene, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining normal vectors for the vertices of each primitive. The values of these coordinates and normal vectors are typically specified in the world coordinate system.

In addition, the transformation of the primitives of the scene from the local coordinate system to a world coordinate system may not be performed by the application executing on the host processor, but may be performed by the graphics subsystem. In this case, the graphics order supplied to the graphics subsystem includes, or points to the transformation matrices stored in the system memory 104, and the graphics subsystem utilizes the transformation matrices to transform the primitives of the scene from the local coordinate system to a world coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 110 (or portions thereof) as described below may be implemented in software together with a processor. The processor may be a conventional general purpose processor, the host processor 128, or a co-processor integrated with the host processor 128.

As shown in FIG. 3, the graphics subsystem 110 includes a control unit 200 that supervises the operation of the graphics subsystem 110. Upon receiving a graphics order to render a scene, the control unit 200 passes the graphics data associated with the graphics order on to a geometry engine 202. The geometry engine 202 transforms the graphics data associated with the graphics order from the world coordinate system to a 3D screen coordinate system (sometimes referred to as a normalized projection coordinate system), clips the graphics data against a predetermined view volume, and transforms the clipped data from the 3D screen coordinate system to a normalized device coordinate system (sometimes referred to as the 2D device coordinate system or the screen coordinate system). In addition, depending upon the shading algorithm to be applied, an illumination model is evaluated at various locations (i.e., the vertices of the primitives and/or the pixels covered by a given primitive). The transformed and clipped graphics data defined by coordinates in the normalized device coordinate system is then passed on to a rasterization stage 212.

The rasterization stage performs scan conversion thereby converting the transformed primitives into pixels, and performs shading calculations and visibility determination which generally stores each primitive's contribution at each pixel in at least one frame buffer 216 and a z-buffer 214. The Z-buffer 214 preferably contains sufficient memory to store a depth value for each pixel of the display 112. Conventionally, the depth value is stored as a 24-bit integer for each pixel. The frame buffer 216 preferably contains sufficient memory to store color data for each pixel of the display 112. Conventionally, the color data consists of three 8-bit integers representing red, green and blue (r,g,b) color values for each pixel. The pixel data is periodically output from the frame buffer 216 for display on the display device 112. The functionality of the geometry engine 202 and rasterization stage 212 may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

According to the present invention, a mechanism is provided that allows a user to define one or more rooms. A room is a region of space, such as a volumetric cell, that is associated with certain objects that are potentially visible (or potentially not visible) when the camera lies within the room. The rooms are distinct from the objects that represent a scene. An object is a collection of primitives (such as a triangle) that correspond to a meaningful subset of a scene (such as a piece of furniture in a room). A preprocessing step checks whether the camera is within a room, and if so determines those objects of the scene that are potentially visible (or potentially not visible) from within the room. Only those objects that are potentially visible from within the room are then rendered for display.

More specifically, the mechanism of the present invention includes a user interface that allows a user to define one or more rooms. A room is a region of space that is associated with a set of objects that are potentially visible (or potentially not visible) when the camera lies within the room. The room may be two-dimensional (for example, a rectangle), or may be three-dimensional (for example, a volumetric cell). Any user interface that allows the user to specify (or draw) a region in space and associate objects (or portions of objects) with the specified region may be used. The data representing the room and the set of objects that are potentially visible (or potentially not visible) when the camera lies within room is generated and preferably stored in the system memory 104. Note that the objects that are identified as potentially visible when the camera lies in the room may not lie in the room. The room may be defined in the model coordinate system, or may be defined in the world coordinate system.

In addition, the user interface may allow the user to control whether or not the rooms are displayed along with the objects of the scene. To view the rooms, the data representing the geometry that defines each room is integrated into the graphics orders supplied to the graphics subsystem. In this case, the rooms may have properties that distinguish the rooms from other objects. For example, each of the rooms may be represented by a wire-frame model, may have a distinctive color or cross hatching, or may contain textures of scenes behind the walls of the room.

Figure 4A:
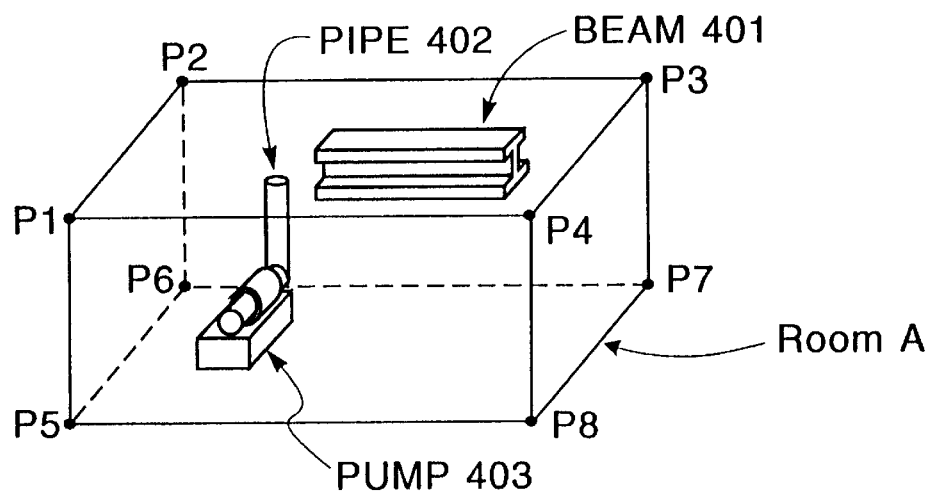
FIG. 4(A) illustrates a room according to the present invention.
Figure 4B:
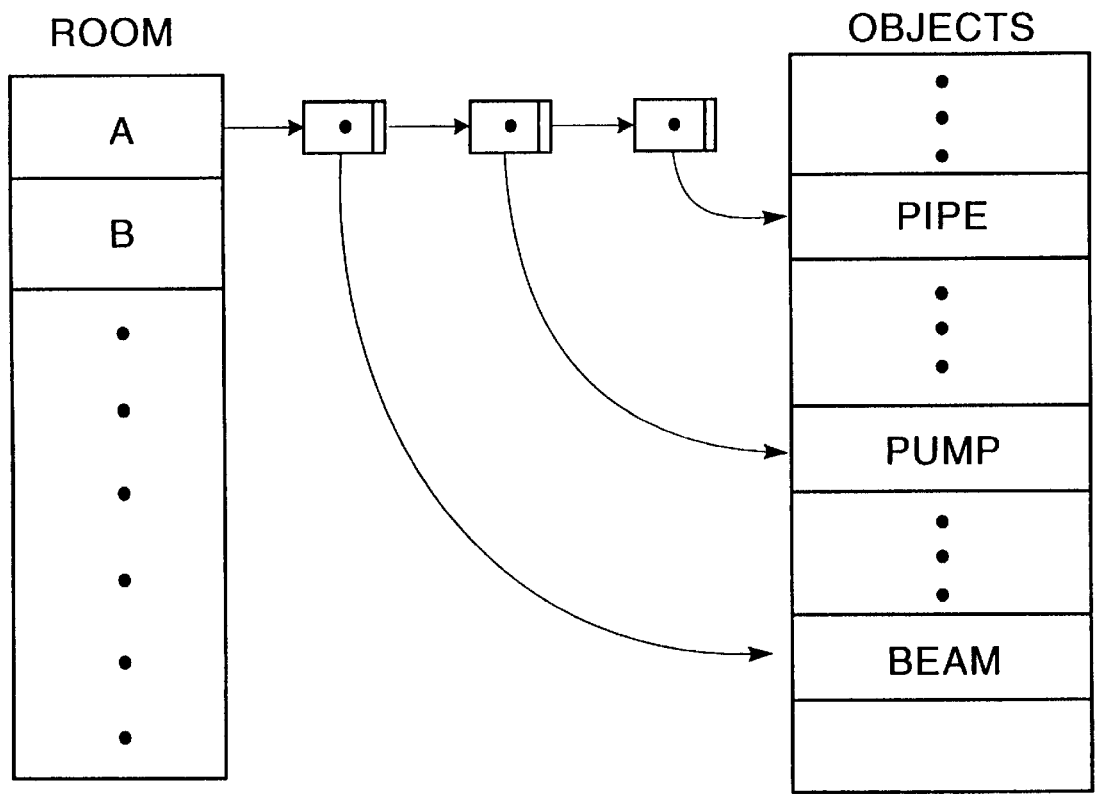
FIG. 4(B) illustrates a data structure that associates a room with a set of objects.

To further explain the concept of a room, consider an example, as shown in FIG. 4(A), wherein a room A that is a volumetric cell define by eight points, p1,p2,p3,p4,p5,p6, p7,p8 and wherein each of the points p1,p2,p3,p4,p5,p6,p7, p8 is represented by geometric coordinates in the world coordinate system. The scene includes, for example, three objects that are visible within the room: a beam 901, a pipe 903, and a pump 905. As shown in FIG. 4(B), data representing the set of objects that are potentially visible (or potentially not visible) when the camera lies within room A is generated and stored in the system memory 104. The data preferably includes an array that includes entries associated with the given room A. Each entry preferably includes a reference that identifies an object that is visible within the room associated with the given entry. Preferably, the association between the entries of the array and a given room is formed by a link list structure as shown.

Figure 5:
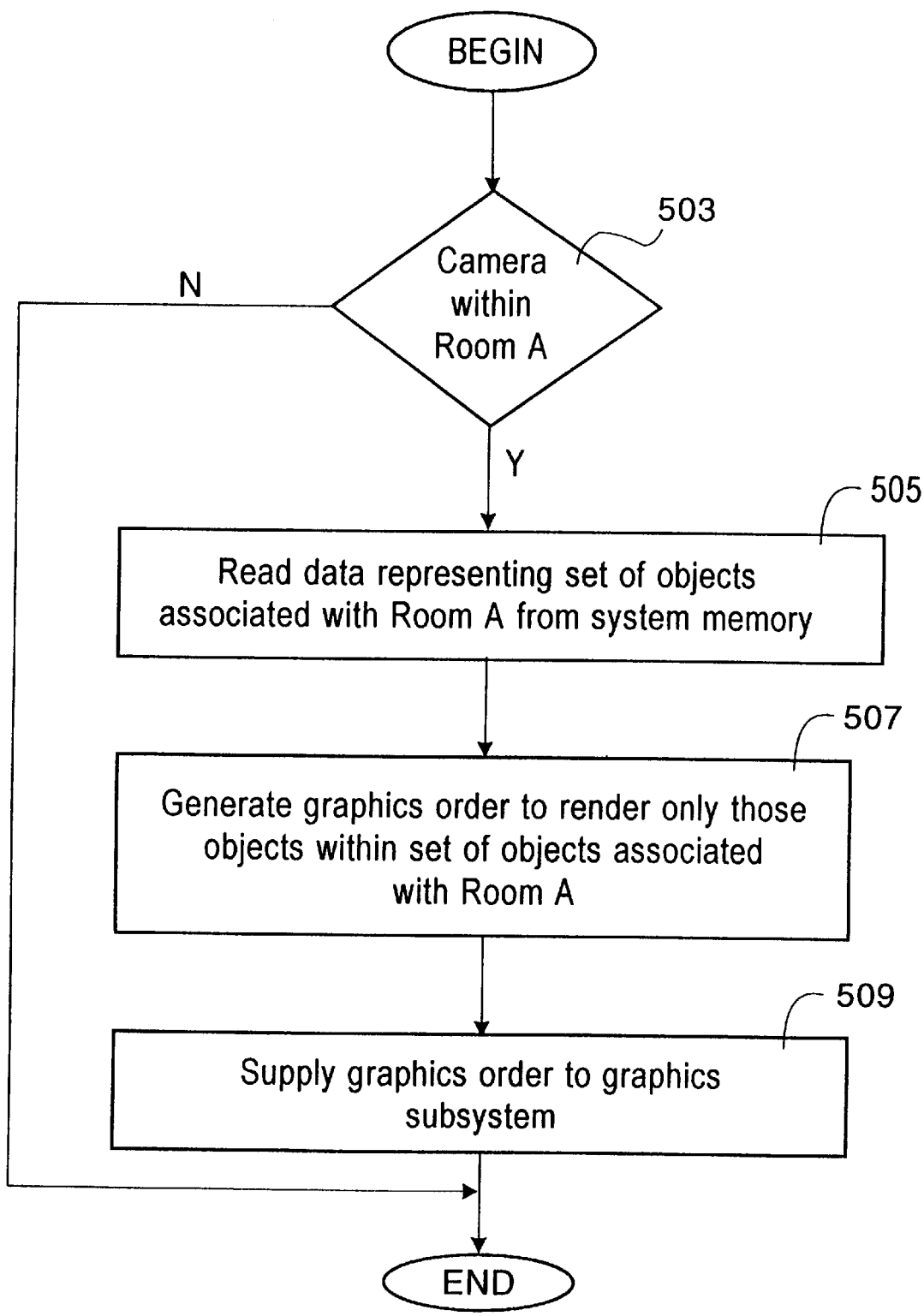
FIG. 5 is a flow chart illustrating the preprocessing of rooms according to the present invention.

As illustrated in the flow chart of FIG. 5, the preprocessing step begins in step 503 by checking whether the camera is within room A. If so, operation continues to step 505 wherein the data representing the set of objects (or portions thereof) that are potentially visible (or potentially not visible) when the camera lies within room A is read from the system memory 104. In step 507, a graphics order is generated to render only those objects (or portions thereof) that are potentially visible from within Room A, which is indicated by the data read from the memory 104 in step 505. In step 509, the graphics order generated in step 507 is supplied to the graphics subsystem wherein the objects are rendered for display.

If the camera is not within room A, the preprocessing step ends with respect to room A. The same steps set forth above may be repeated for each of the rooms specified by the user. If the camera lies within more than one room, the objects associated with one of the rooms (or the objects associated with each room in which the camera lies) may be rendered for display.

In another embodiment of the present invention, the rooms as described above may have one or more associated windows. In this embodiment, a window is a piece of geometry, such as a rectangle, associated with a given room that defines visible/non-visible regions in the world coordinate system that depend upon the position, orientation, and field of view of the camera with respect to the window. If the camera lies outside the room associated with the window, the room and associated window(s) has no effect on the visibility of objects within the scene. However, if the camera lies inside the room, the visible/non-visible regions defined by the window may have an affect on the visibility of objects. Preferably, the position of the window is used to determine the visibility of objects that are outside the set of objects associated with the room. The data representing a window is preferably represented by a set of coordinates, for example the coordinates of corners of the window, in the world coordinate system (or in the model coordinate system), and is stored in the system memory 104. The association between a room and windows may be represented by a hierarchical tree data structure, which is advantageous for non-convex rooms as described below.

Figure 6A:
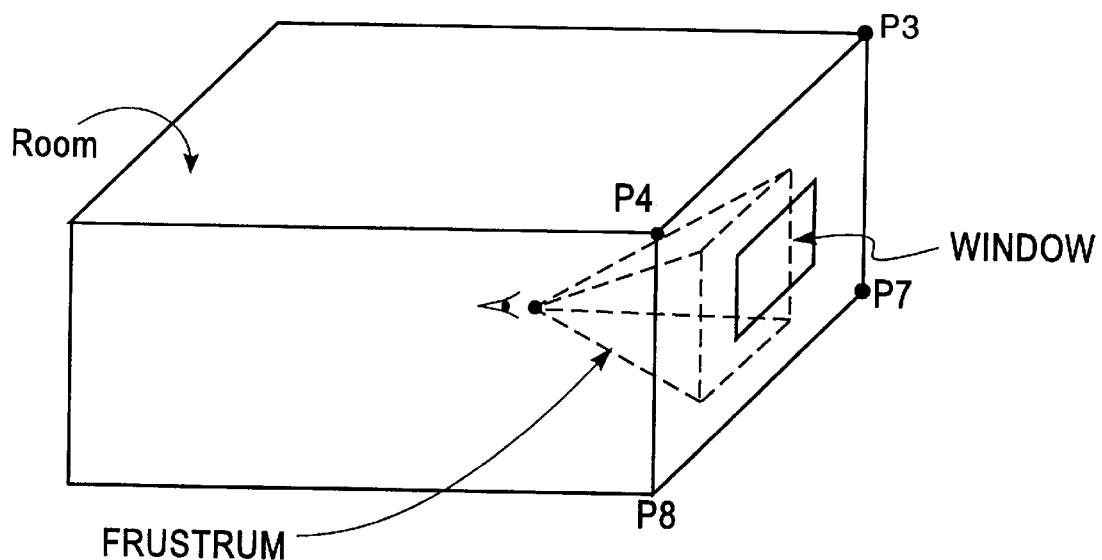
FIG. 6(A) illustrates a room with a window according to the present invention.

FIGS. 6(A) and (B) illustrate the visible/non-visible regions defined by a window in the case where the camera lies within the room associated with the window. For example, as shown in FIG. 6(A), a volumetric room may have a square window in the side of the cell defined by points p3,p4,p7,p8. The position, orientation and field of view of the camera defines a viewing frustrum. As shown, the camera lies inside the room; thus, the visible/non-visible regions defined by the window preferably has an affect on the visibility of objects that are outside the set of objects associated with the room. If the camera was outside the room associated with the window, the room and associated window(s) has no effect on the visibility of objects within the scene.

Figure 6B:
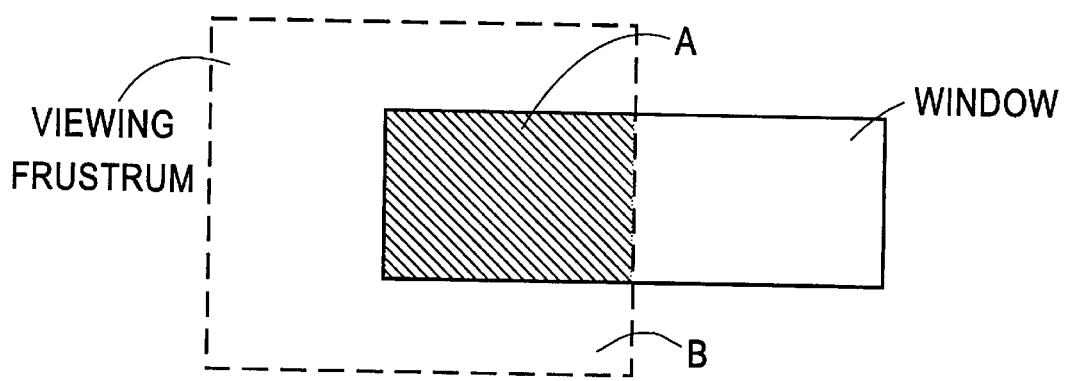
FIG. 6(B) illustrates in two dimensional space the intersection of the viewing frustrum and the window of FIG. 6(A)

As shown in FIG. 6(B), the projection of the viewing frustrum onto the window defines a cross-hatched portion A wherein the viewing frustrum intersects the window, and a second portion B wherein the viewing frustrum does not intersects the window. The visible region defined by the window of FIG. 6(A) is that part of the viewing frustrum that projects onto the cross-hatched portion A. Similarly, the non-visible region defined by the window of FIG. 6(A) is that part of the viewing frustrum that projects onto the second portion B. Those objects that are outside the set of objects associated with the given room may be viewed through the visible region A of the window.

The preprocessing step associated with the rooms and associated windows checks whether the camera is within a given room. If the camera is within the given room, the objects (or portions of the objects) that are within the set of objects associated with the given room are identified. In addition, if the camera is within the given room, objects (or portions of objects) that have the following characteristics are identified:

(1) are outside the set of objects associated with the given room; and
(2) are within the visible region defined by the window(s) associated with the given room.

The identified objects (or portions of objects) are then forwarded to the graphics subsystem wherein the objects are rendered for display.

Figure 7:
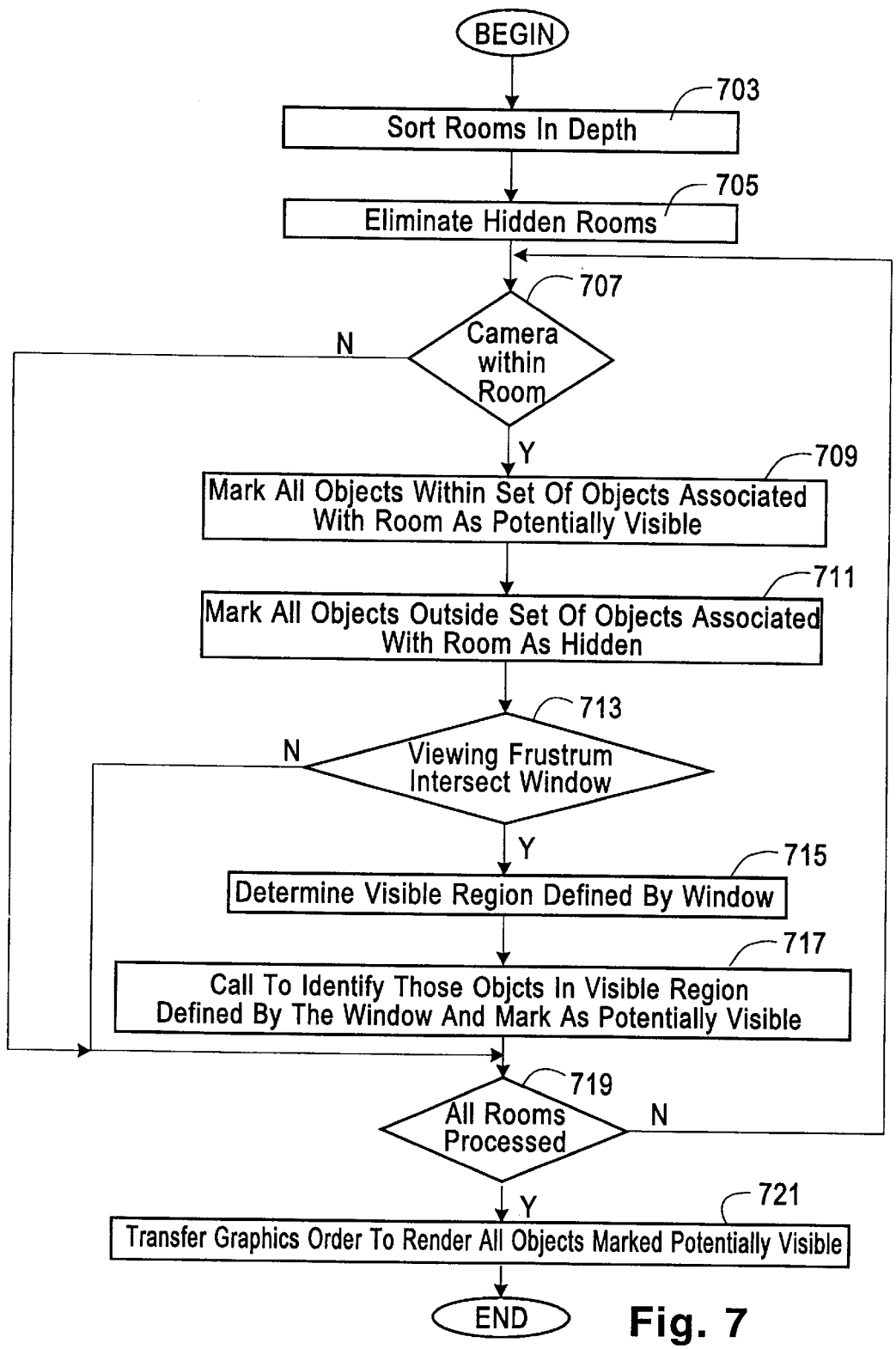
FIG. 7 is a flow chart illustrating the preprocessing of the room with an associated window according to the present invention.

As shown in FIG. 7, the preprocessing step preferably begins in step 703, by sorting the rooms in depth. Then, in step 705, any rooms hidden (or partially hidden) by one or more rooms closer to the camera position are preferably eliminated. This may be accomplished by looping through the rooms beginning with the room the second furthest from the camera position and continuing until the room closest to the camera has been processed as follows: if the current room hides (or partially hides) according to a predetermined criteria a room in back of the current room, then the hidden room (or portion thereof) may be eliminated. Steps 707 to 713 are then performed for each room (or portion thereof) not eliminated in step 705. Preferably, steps 707 to 713 are performed for each room not eliminated in step 705 in a sequence from the back-most room (that room furthest from the camera) to the front-most room (that room nearest to the camera).

In step 707, it is determined if the camera lies within the room. If in step 707 it is determined that the camera lies within the room, operation continues from step 709 to step 717 for each window associated with the room. If in step 707 it is determined that the camera lies outside the room, the preprocessing step continues to step 719.

In step 709, all objects that are within the set of objects associated with the room are marked as potentially visible. In step 711, all object that are outside the set of objects associated with the room are marked as hidden.

In step 713, it is determined if the viewing frustrum intersects the window in the room. This is a geometric test that can be performed using well known techniques in geometric modeling, such as the techniques described in C. M. Hoffman, "Geometric and Solid Modeling", Morgan Kaufmann Publishers, San Mateo, Calif., 1989, pp. 67–109, herein incorporated by reference in its entirety. If in step 713 it is determined that the viewing frustrum intersects the window in the room, operation continues to step 715; otherwise the preprocessing step continues to step 719.

In step 715, the visible region defined by the window is determined, and the operation continues to step 717. The visible region of the window is determined from the intersection of the window and the viewing frustrum. The visible region is preferably represented as an appropriate boolean combination of planes. A more detailed discussion of deriving such a boolean combination of planes is set forth in Requicha, "Representation of Rigid Solids: Theory, Methods and Systems", ACM Computer Surveys, Vol.12, No. 4, 1980, pp. 437–464, herein incorporated by reference in its entirety. In the event that the visible region has a complex geometry, the representation of the visible region may be replaced by an approximation having a less complex geometry.

In step 717, a culling operation is performed to identify those objects (or portions thereof) that lie in the visible region defined by the window, and to mark the identified objects (or portions thereof) as potentially visible. This may be accomplished by setting an identifier associated with the identified object (or portion thereof) to a predetermined value that indicates the object (or portion) is potentially visible. Preferably, the culling operation of step 717 is performed on those objects (or portions thereof) that are marked hidden (i.e., objects that are outside the set of objects associated with the room). The operation then continues to step 719.

In step 719, it is determined if all rooms have been processed. If so, operation continues to step 721; otherwise operation reverts back to step 707 for the next unprocessed room.

In step 721, a graphics order is transferred to the graphics system to render all objects (or portions thereof) that have been marked potentially visible, and the preprocessing step ends. Upon receiving the graphics order generated during preprocessing, the graphics subsystem renders the potentially visible objects (or portion thereof) for display on the display device.

Figure 9A:
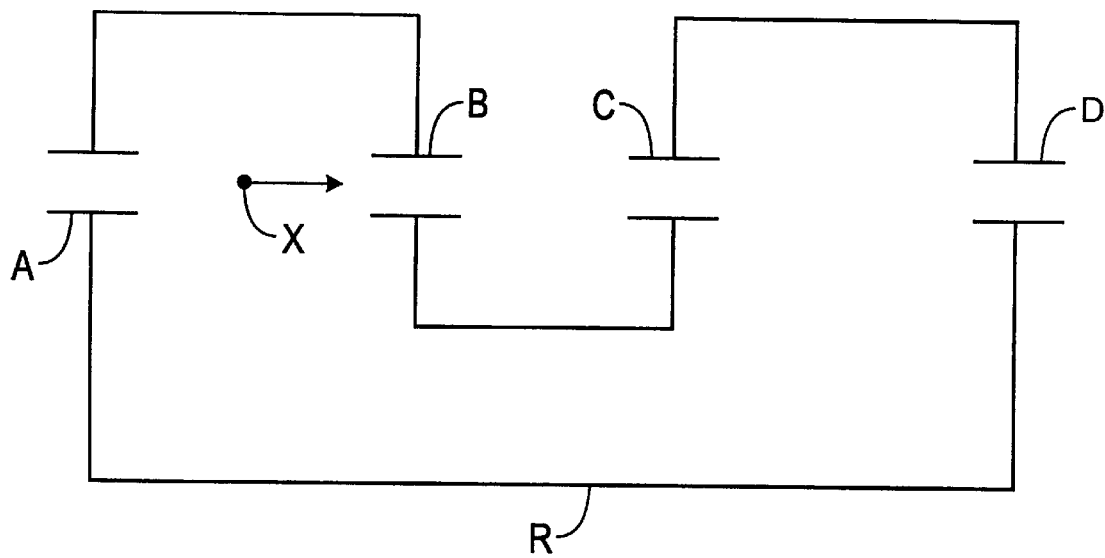
FIG. 9(A) is a cross-sectional view of a non-convex room R and associated windows A,B,C,D.
Figure 9B:
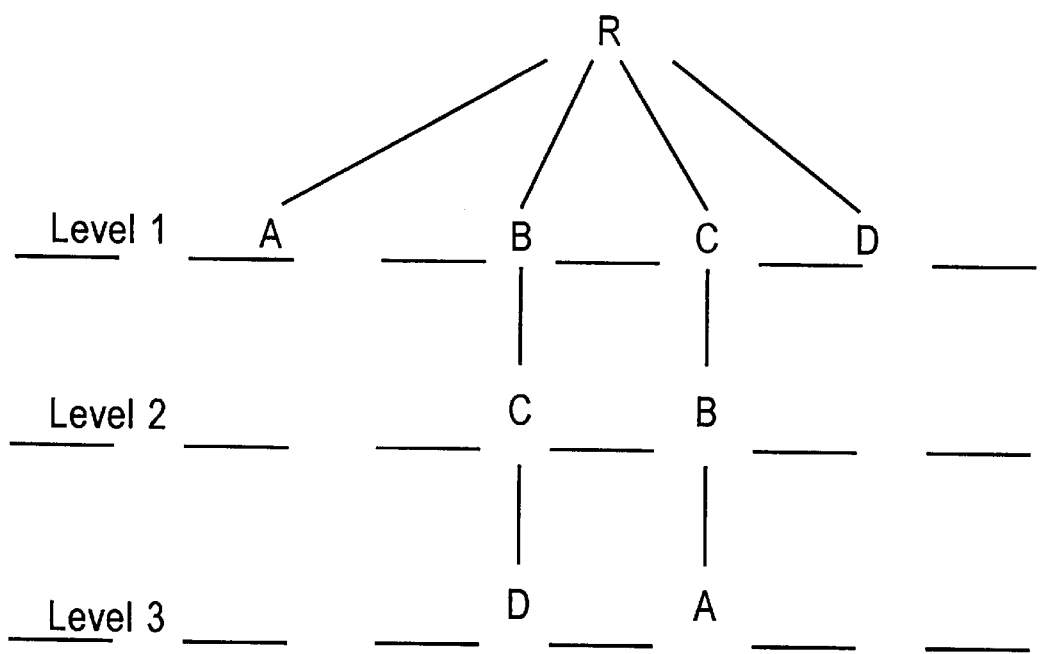
FIG. 9(B) is a pictorial illustration of a hierarchical tree structure representing the association of the windows A,B, C,D and the room R that is used to order the culling operations associated with the windows of the room R such that effect of the appropriate windows are evaluated.

A room may be non-convex. For example, FIG. 9(A) is a cross-section of a non-convex room R with four windows A,B,C,D. Note that in this scenario more than one window may effect the visibility of objects that lie outside the room. For example, if the viewpoint is given by the vector X, the windows that effect the visibility of objects outside the room include the windows B,C,D as shown. Preferably, a hierarchical data structure as shown in FIG. 9(B) is used to represent the association of the windows A,B,C,D and the room R and to order the culling operations associated with the windows of the room R such that effect of the appropriate windows is evaluated. More specifically, steps 709 through 717 are not performed for each room as described above. Instead, the windows of the level 1 nodes of the tree are traversed in order to identify the closest window (in relation to the position of the viewpoint), denoted WC1, that is intersected by the viewing frustrum. Steps 709,715 and 717 are then performed for such closest window WC1. Such steps result in those objects (or portions thereof) that lie in the visible region defined by the window WC1 as being marked potentially visible. In the example illustrated in FIG. 9(A), the closest level 1 window WC1 is window B. Then, the windows of the level 2 nodes that are children of the WC1 node, if any exist, are traversed to identify the closest window (in relation to the position of the view point) of such child nodes, denoted WC2, that is intersected by the viewing frustrum. Steps 715 and 717 are then performed for the window WC2 for those objects (or portiones thereof) marked as potentially visible in the level 1 node processing step. However, for such level 2 node, the objects (or portions) that lie within the visible region defined by the window WC2 are marked as not visible. In the example illustrated in FIG. 9(A), the closest level 2 window WC2 is window C. Then, the windows of the level 3 nodes that are children of the WC2 node, if any exist, are traversed to identify the closest window (in relation to the position of the view point) of such child nodes, denoted WC3, that is intersected by the viewing frustrum. Steps 715 and 717 are then performed for the window WC3 for those objects (or portions thereof) marked as not visible in the level 2 node processing step. However, for such level 3 nodes, the objects (or portions) that lie within the visible region defined by the window are marked as potentially visible. The level 2 node processing steps are preferably repeated for all subsequent even number levels (4, 6, 8 . . . ), if any exist. And the level 3 node processing steps are preferably repeated for all subsequent odd number levels (5, 7, 9 . . . ), if any exist.

In summary, rooms obviate the computationally intensive task of determining and pre-storing cells and cell-to-cell visibility information. Rooms without windows do not require geometric computation, while rooms with windows require geometric queries that are localized spatially only to the projective extents of the windows. Rooms are therefore fast, user-controlled, computationally efficient, convenient, and flexible for arbitrary scenes.

Figure 8A:
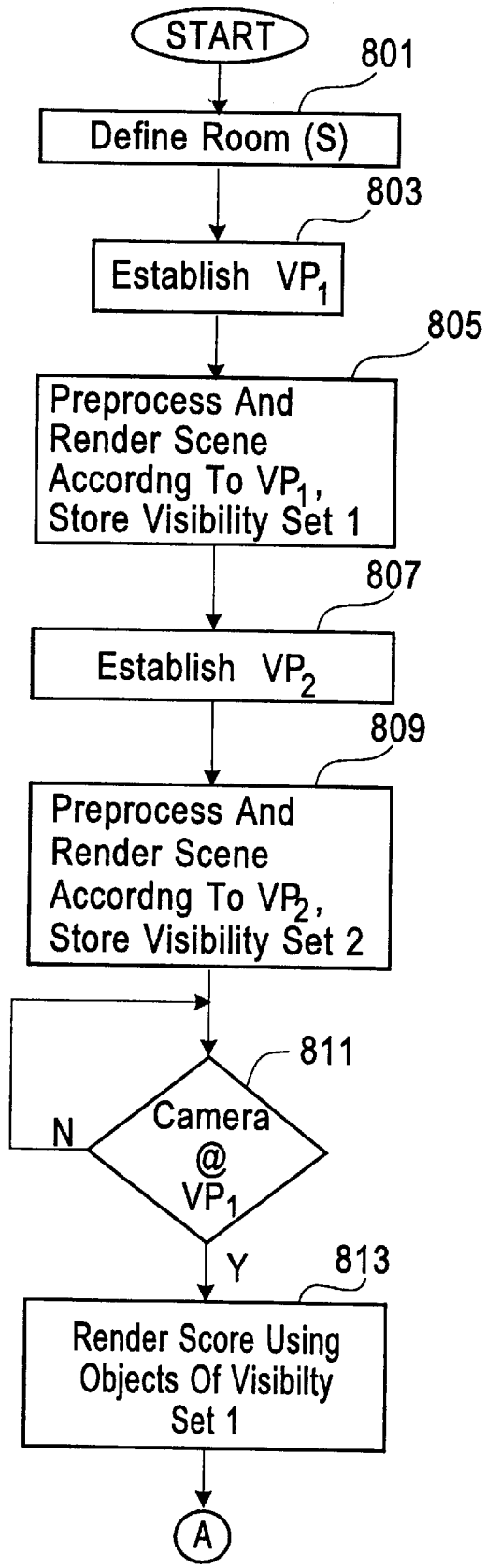
FIGS. 8(A) and (B) is a flow chart illustrating operation of the graphics system in utilizing one or more rooms and associated preprocessing together with visibility sets according to the present invention.
Figure 8B:
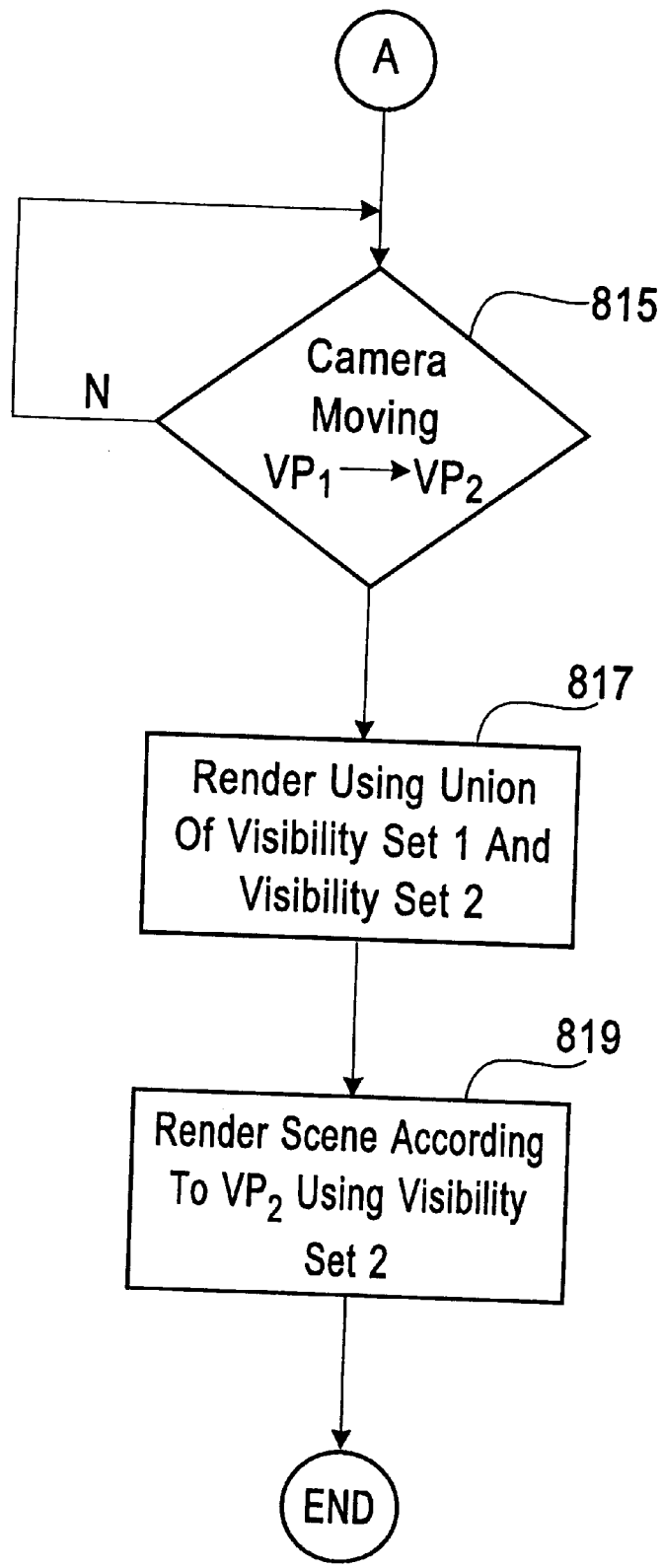

In another embodiment of the present invention, the rooms and preprocessing as described above may be utilized together with visibility sets to provide for efficient visibility determination when the camera is moved between view points. As illustrated in FIGS. 8(A) & (B), in step 801 one or more rooms (and possibly associated windows) are defined by the user and associated with a scene. In step 803, a first view point (i.e., a first camera position, orientation, and view angle) is established according to user input. In step 805, the preprocessing and rendering described above with respect to the embodiment having rooms (or with respect to the embodiment having rooms and windows) is performed for the first view point, and a first visibility set of objects that contribute to the scene as viewed from the first view point is stored, for example, in the system memory 104.

In step 807, a second view point (i.e., a second camera position, orientation, and view angle) is established according to user input. In step 809, the preprocessing and rendering described above with respect to the rooms (or with respect to the embodiment having room and windows) is performed for the second view point, and a second visibility set of objects that contribute to the scene as viewed from the second view point is stored, for example, in the system memory 104.

In step 811, it is determined if the camera is positioned at the first view point (or at a point within a predetermined tolerance band from the first view point); and, if so, in step 813 the scene is rendered using the objects of the first visibility set.

In step 815, is its determined if the position of the camera moves from the first view point (or from a point within a predetermined tolerance band from the first view point) to the second view point (or to a point with a predetermined tolerance band from the second view point); and, if so, in step 817 the scene is rendered using the objects represented by the union of the first and second visibility sets. Step 817 is preferably performed while the position of the camera is interpolated to the second view point. Subsequent or concurrent with step 817, step 819 is performed whereby the scene is rendered according to the second view point using the objects of the second visibility set.

The combination of rooms and visibility sets will typically result in large reduction in the number of objects to be rendered in complex scenes. Importantly, the reduction of the objects rendered in complex scenes is not just restricted to particular domains (e.g. axis-aligned architectural models). Furthermore, the visibility set operations during the camera interpolation tend to typically retain the image fidelity and perceptual coherence during motion, thereby resulting in better performance (faster frame update) as well as better fidelity (greater resolution) for the same scene complexity.

While the invention has been shown and described with reference to particular embodiments thereof, it will be understood by those skilled in the art that the foregoing and other changes in form and detail may be made therein without departing from the spirit and scope of the invention.

We claim:

1. In a computer graphics system wherein a scene is represented by a plurality of three dimensional objects situated in a first coordinate system, wherein each object is represented by graphics data that represent one or more primitives, a method for rendering the scene according to a camera having a characteristic position, orientation and field of view in the first coordinate system, the method comprising the steps of:

in response to user input,
  defining a room that represents a first region in the first coordinate system, wherein said room is distinct from said plurality of objects that represent said scene,
  partitioning said plurality of objects that represent said scene into a first set of objects that are potentially visible from within said room and a second set of objects that are hidden from within said room, and
  storing data that associates one of said first set of objects and said second set of objects with said room;
determining if said camera lies within said room,
upon determining that said camera lies within said room,
  identifying said first set of objects according to said data that associates one of said first set of objects and said second set of objects with said room, and generating first graphics data that represents portions of said first set of objects, wherein said portions of said first set of objects are potentially visible from within said room; and
rendering said first graphics data to thereby render portions of said first set of objects without rendering portions of said second set of objects.

2. The method of claim 1, wherein said room is a two dimensional piece of geometry situated in the first coordinate system.

3. The method of claim 2, wherein said room is a rectangle.

4. The method of claim 1, wherein aid is a three dimensional piece of geometry situated in the first coordinate system.

5. The method of claim 1, wherein said room includes at least one window.

6. The method of claim 5, wherein the step of generating first graphics data includes the steps of:
  determining if a viewing frustrum defined by the characteristic position, orientation and field of view in the first coordinate system of said camera intersects said window;
  upon determining that the viewing frustrum intersects said window, determining a first region according to intersection of the viewing frustrum and the shield; and
  performing a culling operation that generates said first graphics data, wherein said first graphics data represents portions of said first set of objects that lie within said first region.

7. The method of claim 6, wherein said first region is represented by a boolean composition of planes.

8. The method of claim 1, wherein said data that associates one of said first set of objects and said second set of objects with said room is stored as a visibility set associated with the position of said camera.

9. In a computer graphics system wherein a scene is represented by a plurality of three dimensional objects situated in a first coordinate system, wherein each object is represented by graphics data that represent one or more primitives, an apparatus for rendering the scene according to a camera having a characteristic position, orientation and field of view in the first coordinate system, the apparatus comprising:

means, in response to user input, for defining a room that represents a first region in the first coordinate system, wherein said room is distinct from said plurality of objects that represent said scene, for partitioning said plurality of objects that represent said scene into a first set of objects that are potentially visible from within said room and a second set of objects that are hidden from within said room, and for storing data that associates one of said first set of objects and said second set of objects with said room;

means for determining if said camera lies within said room;

means for identifying said first set of objects according to said data that associates one of said first set of objects and said second set of objects with said room upon determining that said camera lies within said room;

means for generating first graphics data that represents portions of said first set of objects; and means for rendering said first graphics data to thereby render portions of said first set of objects without rendering portions of said second set of objects.

10. The apparatus of claim 9, wherein said room is a two dimensional piece of geometry situated in the first coordinate system.

11. The apparatus of claim 10, wherein said room is a rectangle.

12. The apparatus of claim 9, wherein said room is a three dimensional piece of geometry situated in the first coordinate system.

13. The apparatus of claim 9, wherein said room includes at least one window.

14. The apparatus of claim 13, wherein said means for generating first graphics data includes:
  means for determining if a viewing frustrum defined by the characteristic position, orientation and field of view in the first coordinate system of said camera intersects said window;
  means for determining a first region according to intersection of the viewing frustrum and the shield upon determining that the viewing frustrum intersects said window; and
  means for performing a culling operation that generates said first graphics data, wherein said first graphics data represents portions of said first set of objects that lie within said first region.

15. The apparatus of claim 14, wherein said first region is represented by a boolean composition of planes.

16. The apparatus of claim 9, wherein said data that associates one of said first set of objects and said second set of objects with said room is stored as a visibility set associated with the position of said camera.

* * * * *